(12) United States Patent
Conner et al.

(10) Patent No.: US 11,643,002 B1
(45) Date of Patent: May 9, 2023

(54) TEMPORARY SHELTER

(71) Applicant: Life Cube, Inc., Santa Barbara, CA (US)

(72) Inventors: Michael Conner, Santa Barbara, CA (US); Marie Profant, Santa Barbara, CA (US)

(*) Notice: Subject to any disclaimer, the term of this patent is extended or adjusted under 35 U.S.C. 154(b) by 47 days.

(21) Appl. No.: 17/212,063

(22) Filed: Mar. 25, 2021

Related U.S. Application Data

(60) Provisional application No. 62/994,364, filed on Mar. 25, 2020.

(51) Int. Cl.
*B60P 3/34* (2006.01)
*B60R 9/06* (2006.01)
*E04B 1/343* (2006.01)
*B60P 3/32* (2006.01)
*B62D 33/02* (2006.01)

(52) U.S. Cl.
CPC .............. *B60P 3/34* (2013.01); *B60P 3/32* (2013.01); *B60R 9/06* (2013.01); *B62D 33/0207* (2013.01); *E04B 1/34384* (2013.01); *E04B 2001/34389* (2013.01)

(58) Field of Classification Search
CPC ..... B60P 3/32; B60P 3/34; B60R 9/06; B60R 9/065; B62D 33/0207; B62D 33/0612; B62D 33/0621; B65G 7/12
USPC .......................... 224/400; 296/165, 168, 173
See application file for complete search history.

(56) References Cited

U.S. PATENT DOCUMENTS

| | | | | |
|---|---|---|---|---|
| 2,883,713 | A * | 4/1959 | Zug | E04B 1/3445 52/264 |
| 5,622,198 | A * | 4/1997 | Elsinger | E04H 15/48 135/128 |
| 8,001,985 | B1 | 8/2011 | Conner | |
| 2008/0110484 | A1 * | 5/2008 | Doran | E04B 1/34315 135/121 |
| 2013/0093208 | A1 * | 4/2013 | Peck | B60P 3/341 296/165 |
| 2015/0117994 | A1 * | 4/2015 | Defrancq | E06B 3/70 49/394 |
| 2015/0246699 | A1 * | 9/2015 | Anabtawi | B60P 3/42 280/504 |
| 2015/0321716 | A1 * | 11/2015 | Patterson | B62D 63/061 280/509 |
| 2017/0240088 | A1 * | 8/2017 | Tait | B60R 9/00 |
| 2018/0087288 | A1 * | 3/2018 | Boettiger | E04H 15/46 |

FOREIGN PATENT DOCUMENTS

EP 3950426 A1 * 2/2022 ................ B60P 3/34

* cited by examiner

*Primary Examiner* — Jason S Daniels
(74) *Attorney, Agent, or Firm* — Sandy Lipkin

(57) ABSTRACT

A temporary shelter that provides climate-controlled storage, workspace, living space, meeting rooms, equipment rooms and the like, which includes a number of floor panels, a number of which form one or more cubed enclosures, inside which are hard, ruggedized interlocking wall panels with recessed portions for the containment therein of desired components that can be housed and stored therein. The shelter when in the enclosed configuration is transportable through a specialized separate hauler. The hauler is a lift that is transportable and attaches to the rear of a vehicle via receivers mounted to the chassis.

15 Claims, 17 Drawing Sheets

TEMPORARY SHELTER

BACKGROUND OF THE INVENTION

Reference to Prior Application

This application claims priority of the provisional patent application 62/994,364, filed Mar. 25, 2020 entitled SUPER CUBE SYSTEM by Michael Conner and Marie Profant.

FIELD OF THE INVENTION

The field of this invention relates generally to the field of temporary shelters and, more particularly, to a self-contained, easily transportable shelter system comprised of one or more enclosed cubes that may be used for dry climate-controlled storage, a workspace, a meeting room, an equipment room or other temporary sheltered space.

DESCRIPTION OF THE PRIOR ART

There may be times when there is a need for a temporary shelter, such as for dry, climate-controlled storage, workspace, living space, meeting rooms, equipment rooms and the like. The instant invention seeks to provide a versatile system that contains all of the components of a temporary shelter that is compact and easily transportable. Additionally, the shelter is rugged and can withstand harsh elements.

The inventor of the instant invention is the owner of U.S. Pat. No. 8,001,985 and the within disclosure expands on the invention described therein which includes stiff, ruggedized walls in the place of the inflatable walls of the '958 patent, and includes the ability for a single person to transport the cube through the use a separate, specialized hauler that can be attached to a vehicle that has a slim profile but is transformable into either a fork lift or a platform with two or more hitching receivers to allow for the transport of a 1000 pound enclosed cube or any other heavy object that cannot be carried by prior art devices.

Furthermore, because the instant invention provides for hard surfaces rather than soft surfaces for a more rugged and durable shelter which can withstand even harsher elements that the shelter of the '985 invention.

The ruggedized walls can stack on each other through a variety of connecting mechanisms, including the use of dowels, slim fit connector sides or foldable hinges. The wall panels are separate and fit easily inside the walls of the one or more shelter-cubes that are compact and relatively easily transportable. Each panel includes recessed portions that act as compartments for the storage of a myriad of survival items and leave-outs for which utilities, such as cabling, and piping can be routed.

SUMMARY OF THE INVENTION

The basic embodiment of the present invention teaches a self-contained shelter comprising: at least one enclosure having a cubic shape which is a top, a bottom, and four side walls; a plurality of generally rectangular or square unattached floor panels contained inside, each of said floor panels having a top surface, a bottom surface and four sides; a plurality of stiff, ruggedized wall panels contained inside, each of said wall panels having a top surface, a bottom surface and four sides; and a plurality of life-supporting accessories contained inside said at least one enclosure, whereby, said enclosure and said plurality of generally rectangular unattached floor panels connect to form a raised floor and wherein said plurality of stiff, ruggedized wall panels connect to form an enlarged shelter composed of four or more walls and a roof constructed by connecting said plurality of wall panels.

The above embodiment can be further modified by defining that the invention further comprises a hauler to transport said enclosure as defined in claim 1 wherein said hauler has a slim profile comprising a main frame with at least two retractable members attached thereto that can extend away from said main frame in a substantially perpendicular orientation thereto wherein said retractable members and said main frame convert to a fork-lift configuration and wherein said main frame is attachable by two more hitches to a motor vehicle or trailer thus enabling said hauler to accommodate the weight of said enclosure.

The above embodiment can be further modified by defining that said hauler includes a platform or boom is attachable to said retractable members.

The above embodiment can be further modified by defining that each of said stiff, ruggedized wall panels is made of foam and treated with a liquid based coating that cures into a hard-surface.

The above embodiment can be further modified by defining that any of said stiff, ruggedized wall panels can include a recessed portion for the placement therein of embedded accessories or routing of utilities, such as cabling and piping.

The above embodiment can be further modified by defining that any two of said stiff, ruggedized wall panels can connect to each other to enlarge any constructed wall in a horizontal direction or in a vertical direction.

The above embodiment can be further modified by defining that any two stiff, ruggedized wall panels are connected with dowels.

The above embodiment can be further modified by defining that any two stiff, ruggedized wall panels are connected via foldable hinges.

The above embodiment can be further modified by defining that said stiff, ruggedized wall panels are shaped with slip fittings on each side such that a female portion connects with a male portion on a second stiff, ruggedized wall panel.

The above embodiment can be further modified by defining that said accessories come from the group comprising: solar panels, heat sinks, cabling, piping, weather stations, electrical panels, batteries, water storage.

The above embodiment can be further modified by defining that any of said stiff, ruggedized wall panels can be configured to include a window or a door.

The above embodiment can be further modified by defining that any of said floor panels can include recessed portions for the securing of desired accessories therein, and leave-outs for utilities.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
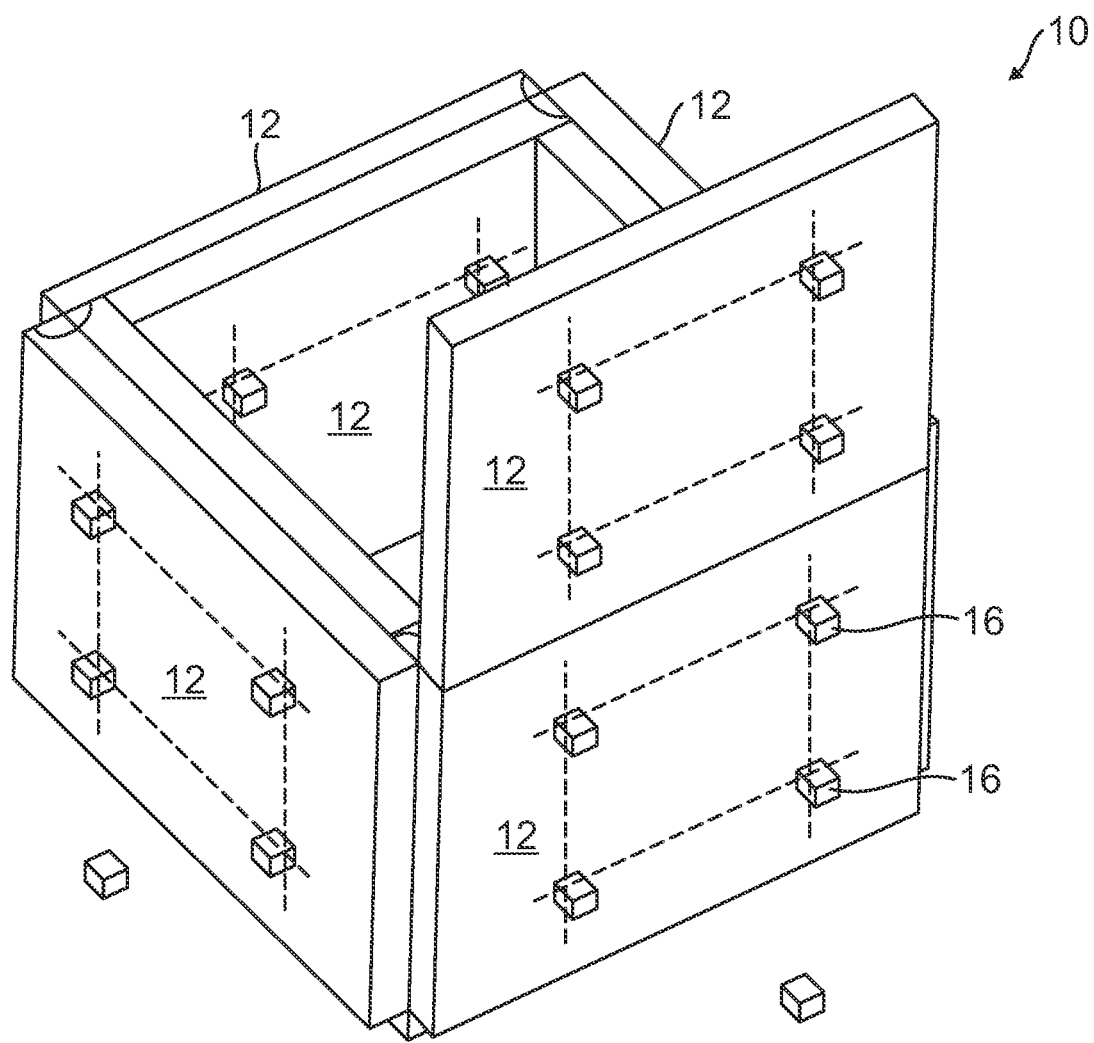
FIG. 1 is a top perspective view of storage enclosure cube with the top open.

Turning to the drawings, the preferred embodiment is illustrated and described by reference characters that denote similar elements throughout the several views of the instant invention.

The preferred embodiment of the instant invention provides for a temporary, self-contained shelter that is provided from one or more enclosures 10 that are constructed from a number of raised floor panels 12, preferably constructed of a hard plastic. In the preferred embodiment, six rectangular floor panels 12 form an enclosure 10, although the enclosure 10 could be made up of another number of floor panels 12 without departing from the scope of the invention. An enclosure 10, when it is delivered to the site for deployment, is generally secured by one or more straps and encloses additional panels 14 that are hard, made of foam and treated with polyurea for extra durability. Raised members 16 are found along the outside of the floor panels 12 that allow for the assembled floor to be raised from the elements.

Figure 9:
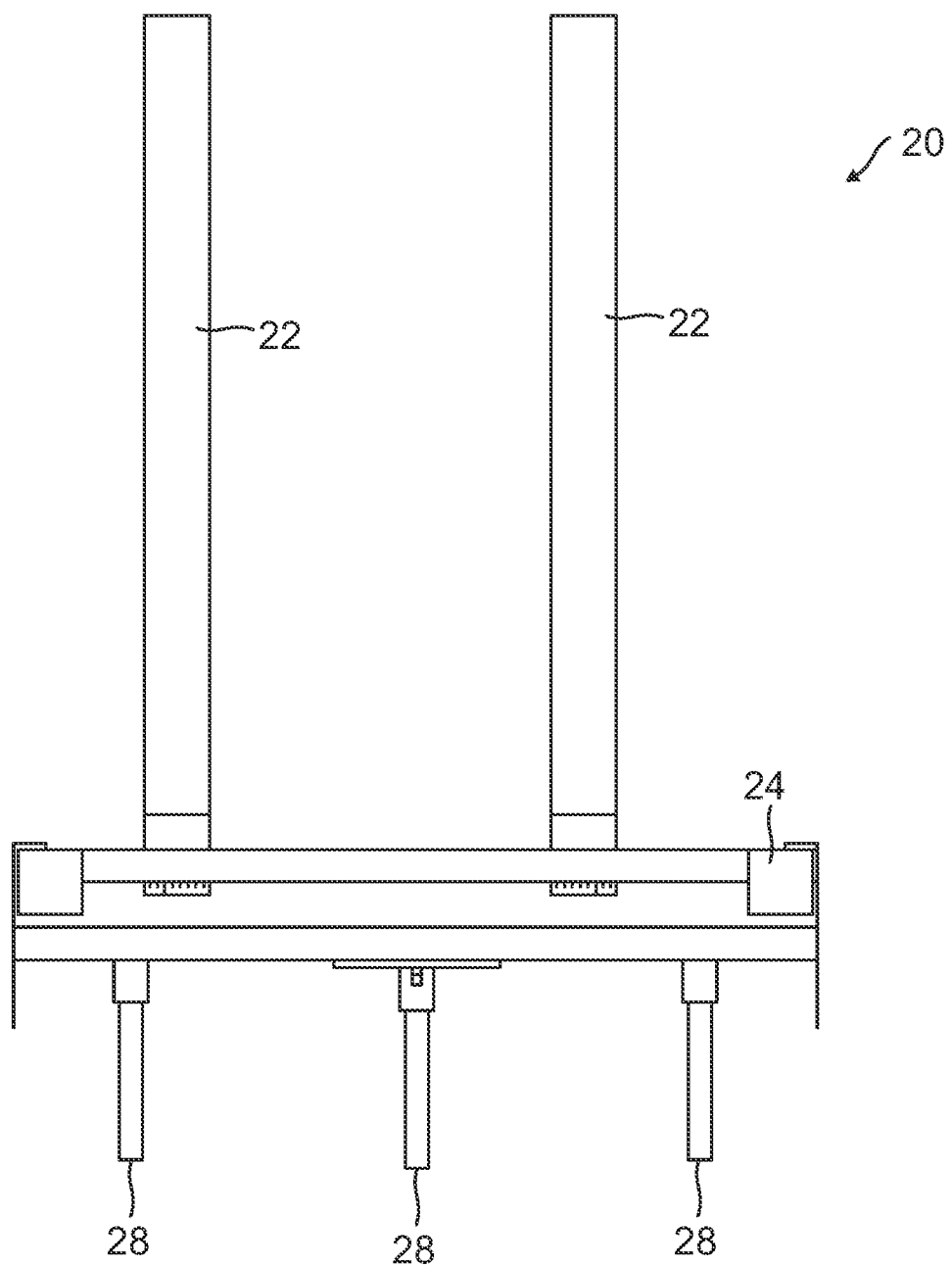
FIG. 9 is a top view of the specialized separate hauler of the instant invention deployed as a forklift and showing three attachment points for attachment to a vehicle.

The self-contained shelter according to the present invention may be air-dropped, trucked in, wheeled, carried or dragged to the desired location. A specialized separate transporter/hauler 20 can be added to the system such that the self-contained enclosed cube 10 can be hauled through attachment to a vehicle through two or more hitching receivers. (See FIGS. 4-9.) The transporter/hauler 20 has a slim profile (See FIG. 4) when not deployed and can easily attach to a vehicle and maintain a minimum amount of space. To use, the transporter/hauler 20 can be transformed to be used as either a forklift (See FIG. 9) or a platform (See FIGS. 5-8) to haul the self-contained cube 10 or any other large item that traditional platforms cannot support.

Figure 4:
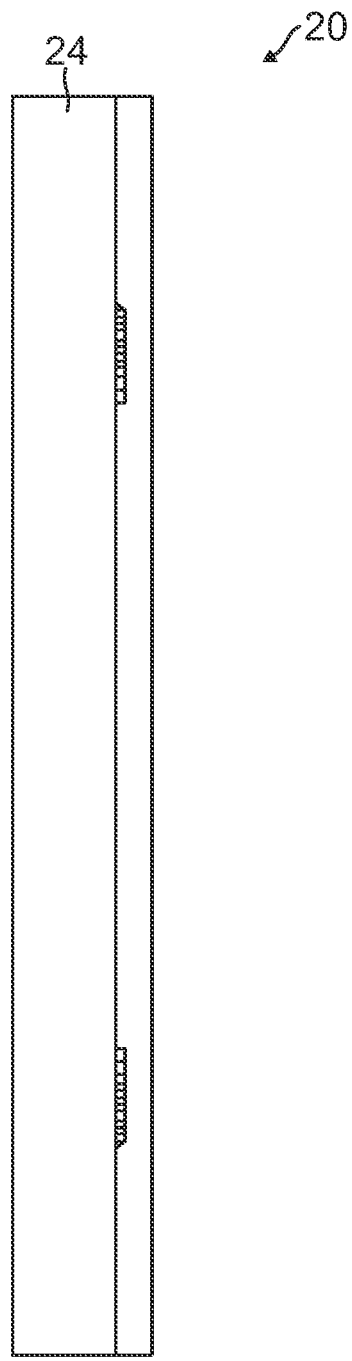
FIG. 4 is a side view of the specialized separate hauler of the instant invention in the retracted, storage position.
Figure 5:
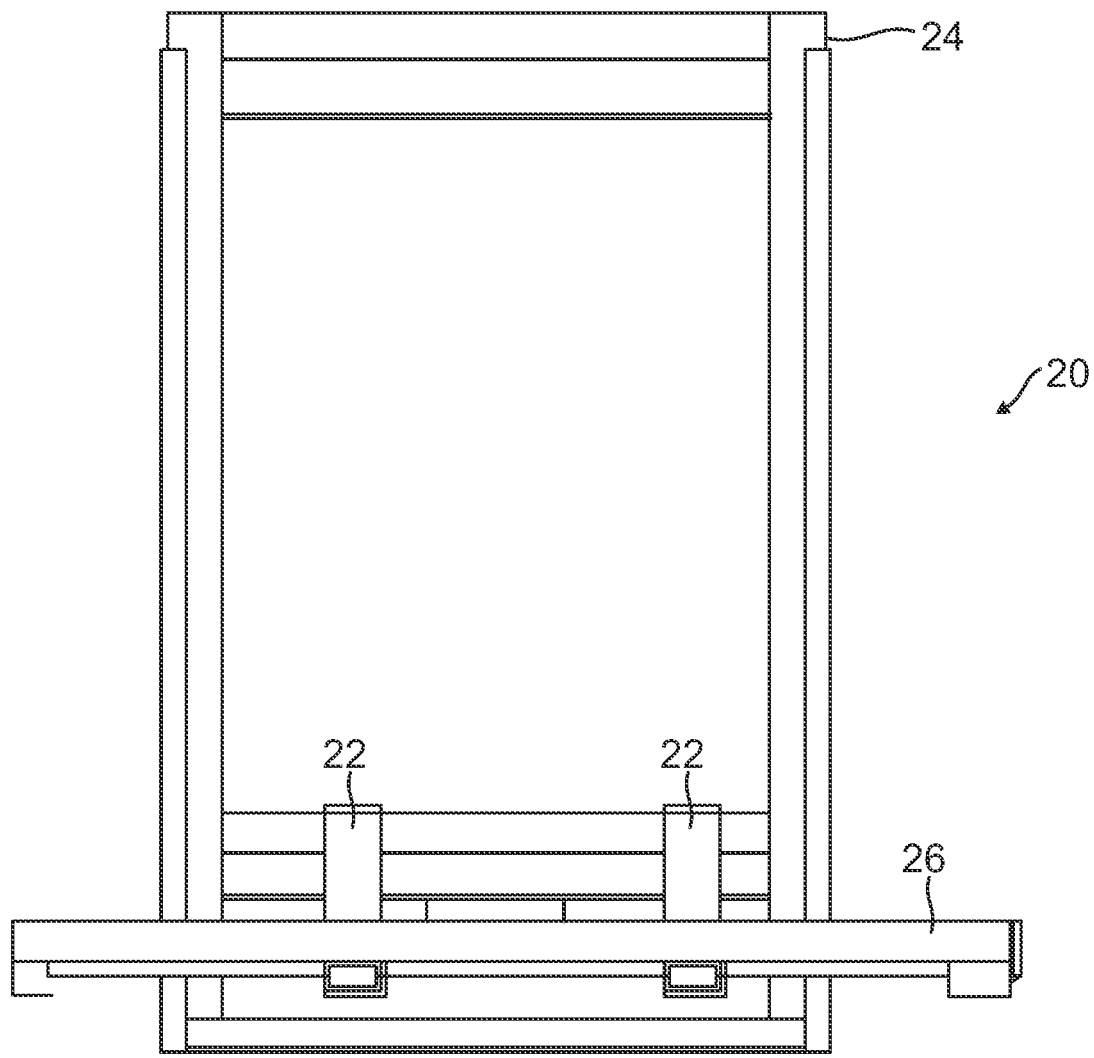
FIG. 5 is a front view of the specialized separate hauler of the instant invention deployed as a platform which can carry the shelter cube thereon.
Figure 6:
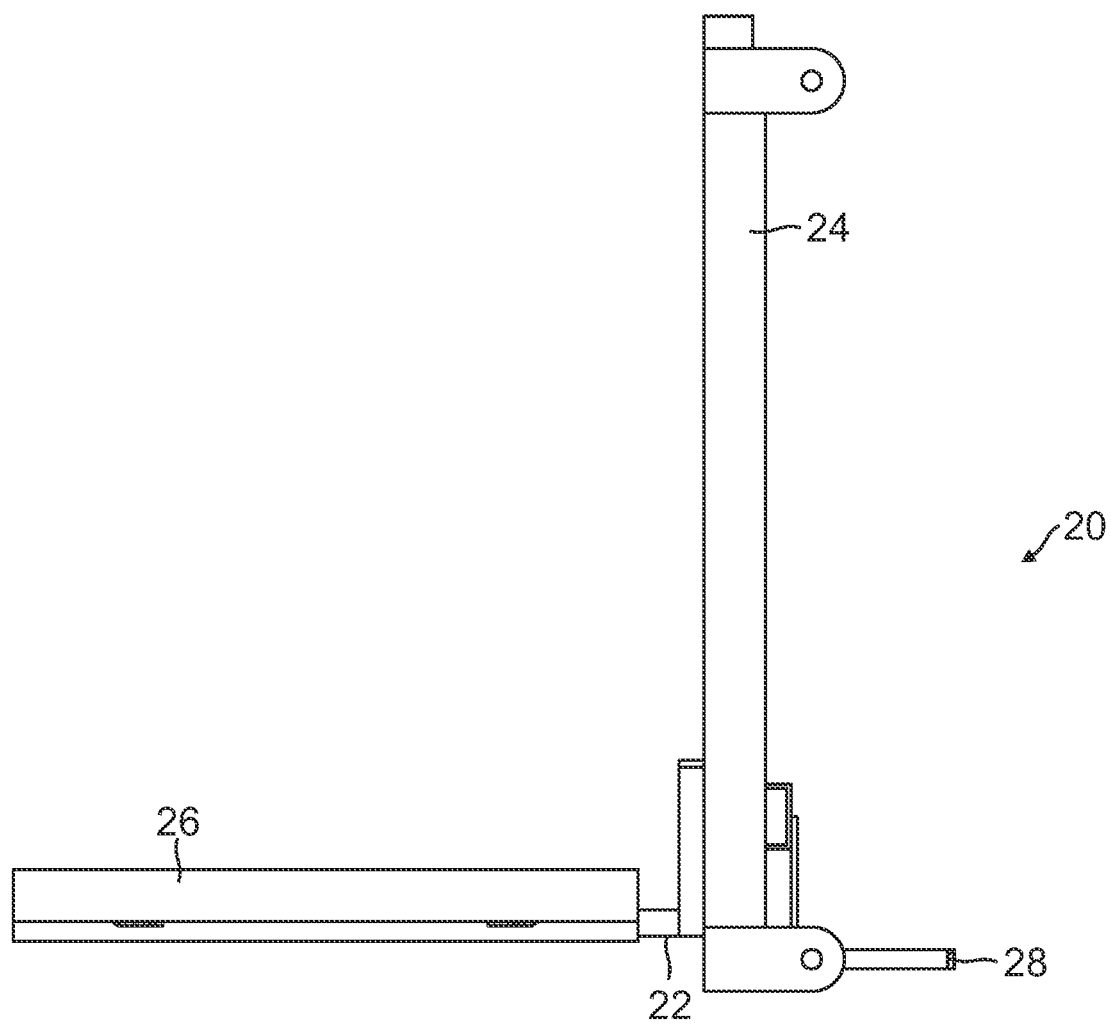
FIG. 6 is a side view of the specialized separate hauler of the instant invention deployed as a platform which can carry the shelter cube thereon.
Figure 7:
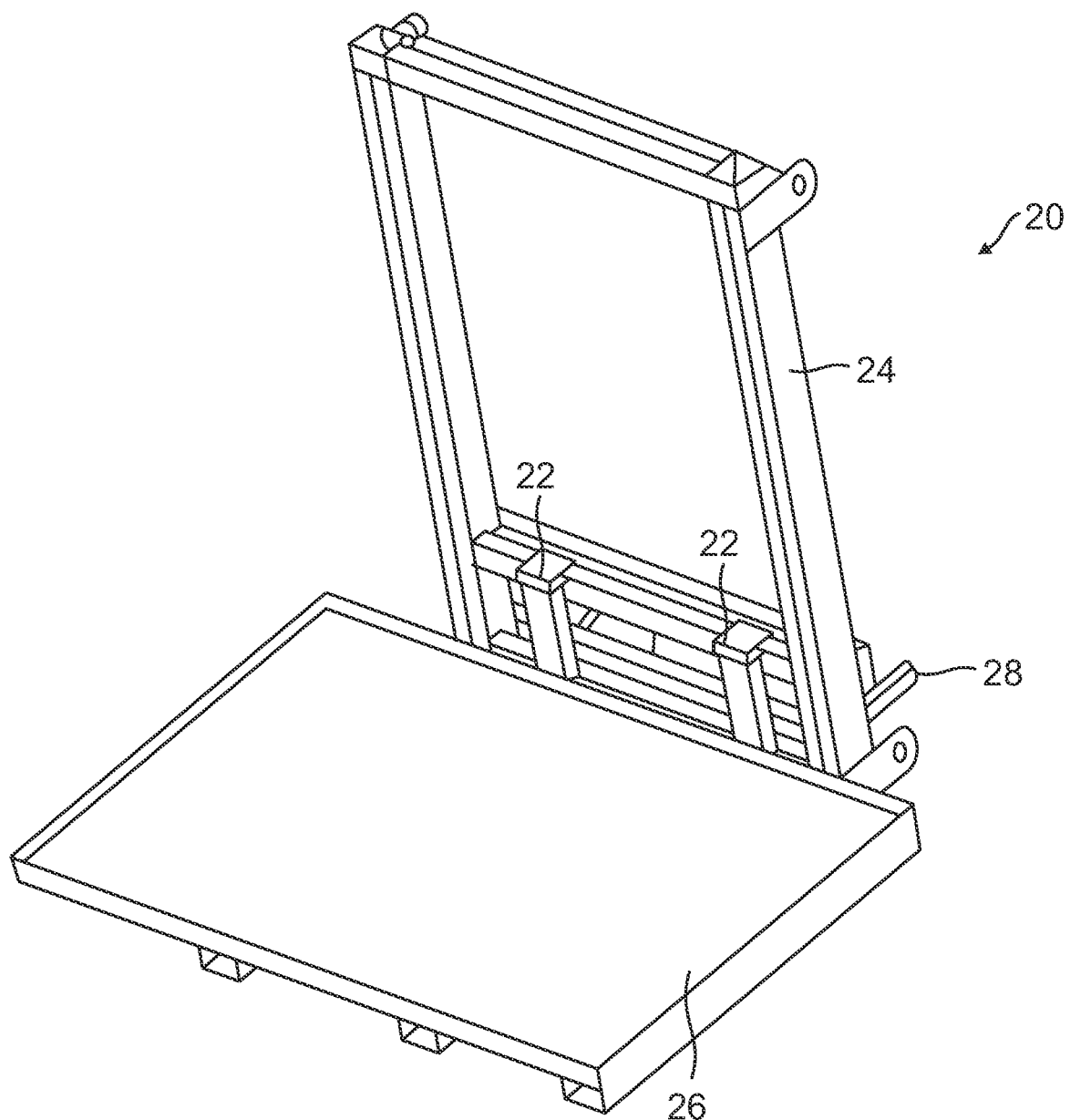
FIG. 7 is a front top isometric view of the specialized separate hauler of the instant invention deployed as a platform which can carry the shelter cube thereon.
Figure 8:
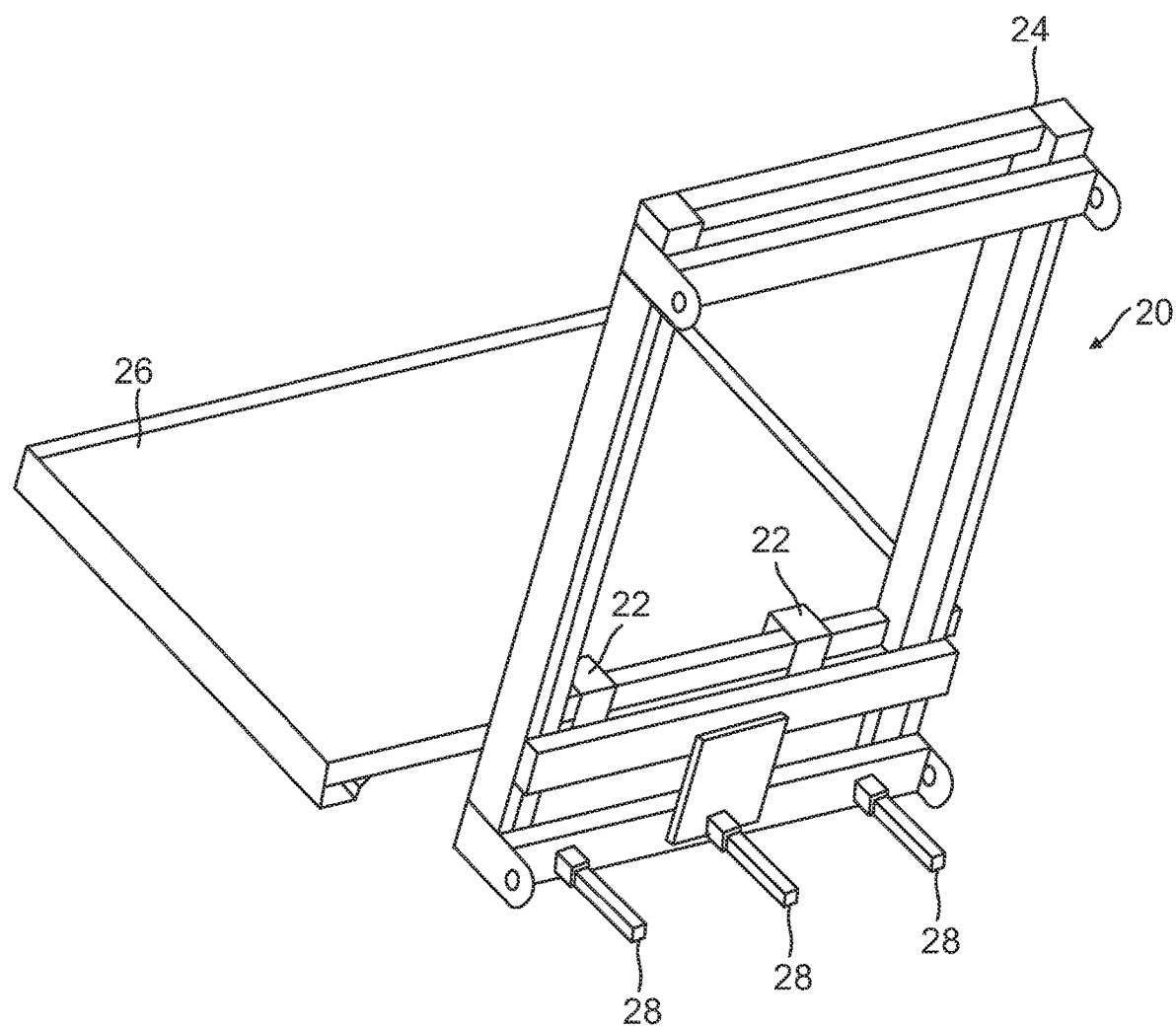
FIG. 8 is a rear top isometric view of the specialized separate hauler of the instant invention deployed as a platform which can carry the shelter cube thereon.

To use the transporter/hauler 20, retractable elements 22 can be separated away from the slim profile frame as seen in FIG. 4 to create a perpendicular configuration where the elements 22 can operate as a forklift or a platform 26 can be placed thereon to hold the load. Two or more hitching points 28 allow for attachment to a vehicle and provide for the ability to carry a heavier load than a typical platform. The transporter/hauler 20 is contemplated for use when the cube enclosure 10 is accompanied by a support vehicle.

The transporter/hauler 20 provides for lifting equipment that is mounted to the main structure of a sturdy vehicle, such as a pickup truck or trailer, through at least 2 attachments. The hauler 20 or lift can connect to vehicle in the following ways: 1) the chassis or bumper or trailer hitch and sides of a truck bed; 2) two or more permanently mounted receivers such as a welded or bolt on trailer receiver and additional receiver.

The lift 20 includes a control system to monitor the weight of the load being lifted and position of lift 20. Information can be displayed or fed back to the vehicle control system, to indicate how much weight is on the lift 20 or lift position for informational and decision-making purposes: for example, prior to driving the vehicle, the lift 20 must be in its up position and load must be within allowable limits. The lift 20 can be configured so that either it just raises/lowers packages or raises the package to be even with a vehicle surface, such as a truck bed or trailer floor, so that packages can be pushed onto vehicle surface. The lift 20 can be manually operated through the turn of a wheel/handle, a manually operated winch or chain hoist, or the move of a lever. Alternatively, it can be electronically operated through an electric/hydraulic actuator, a motorized cable winch, or a motorized chain hoist.

The lift 20 comprises at least two fork extensions 22 that raise or lower the same equipment that a forklift or pallet jack may lift, such as a wood pallet or crate. The lift 20 can have a flat platform 26 either configured as a large surface for placing larger items onto, for example, a large box, an ATV, a refrigerator, or a mobile scooter or a narrower surface, such as a ramp or rail for placing specialized equipment thereon such as a motorcycle or where a rotating, pivoting boom, such as an engine hoist is attached to lift awkward, heavy objects like engines or transmissions onto a truck bed. The lift 20 could either raise objects with a linear guide rail system or a 4-bar parallelogram linkage system. The lift 20 can be easily assembled/disassembled as needed, so that it can be stored elsewhere when not in use or provide the ability to be used on different vehicles. The lift 20 can also be permanently attached to vehicle.

The hauler/lift 20 allows one person to easily transport heavy loads of cargo, using their existing car or truck, without a trailer. The hoist (winch), that lifts and lowers extra heavy loads, is controlled by a remote device. The platform 26 hangs on the mast when not in use, and the forks 22 nest in the platform 26. This diminishes the length of the lift 20 when not cargo laden. The spacing of the forks 22 can be a fixed width, or adjustable, depending on the cargo size and shape. Optional strapping attached to the vehicle can be used to strengthen the mast.

By using the vehicle's existing 12-volt power to drive a winch or hoist or a hydraulic ram, cargo is raised and lowered with forklift forks 22, or any of a multitude of platform configurations 26, up and down approximately 48" from the ground. The hauler's 20 differentiation is based on its ability to easily lift very heavy loads from ground level to a safe transport height, eliminating ramps or other devices that are typically used to load the carrier. Most cargo carriers have a maximum weight tolerance of 500 pounds, while hauler/lift 20 can carry up to 3000 pounds. Most trailers extend at least 8' to 12' behind any vehicle, while the hauler/transporter/lift 20 extends only 4'. This short length, and the stability of the hitch, make it much easier to maneuver than any trailer. This is a key characteristic of the unit, unlike any other carrier manufactured. It has multiple, uses. Forks 22 for any kind of palette, a platform 26 that fit on the forks 22 for any cargo, and the strength for heavy loads.

The hauler 20 was first conceived to transport the within described cube enclosures 10. Using the forks 22 like an inverted forklift, the hauler 20 allows such cargo to be easily transported by one person. Some common additional uses would be to move motorcycles, scooters for the handicapped, and ATVs. The hauler 20 cargo platform 26 can be any shape and can be loaded with anything. Characteristics of the frame 24 include two vertical guide rails and two cross members that have either slides or rollers to allow the hauler 20 to move the carriage up and down; an electric or hydraulic power system to raise or lower a platform 26, using a winch or chain fall or a configuration of hydraulic rams to raise and lower the platform 26 or forks 22 with a capacity from 1 to 2500 pounds easily with push button controller on a cord. At the bottom cross member are one, two or three standard-made trailer receiver hitches at the opposite side of the forks 22 or plate 26, that fit into a standard or modified trailer receiver hitch.

Figure 2:
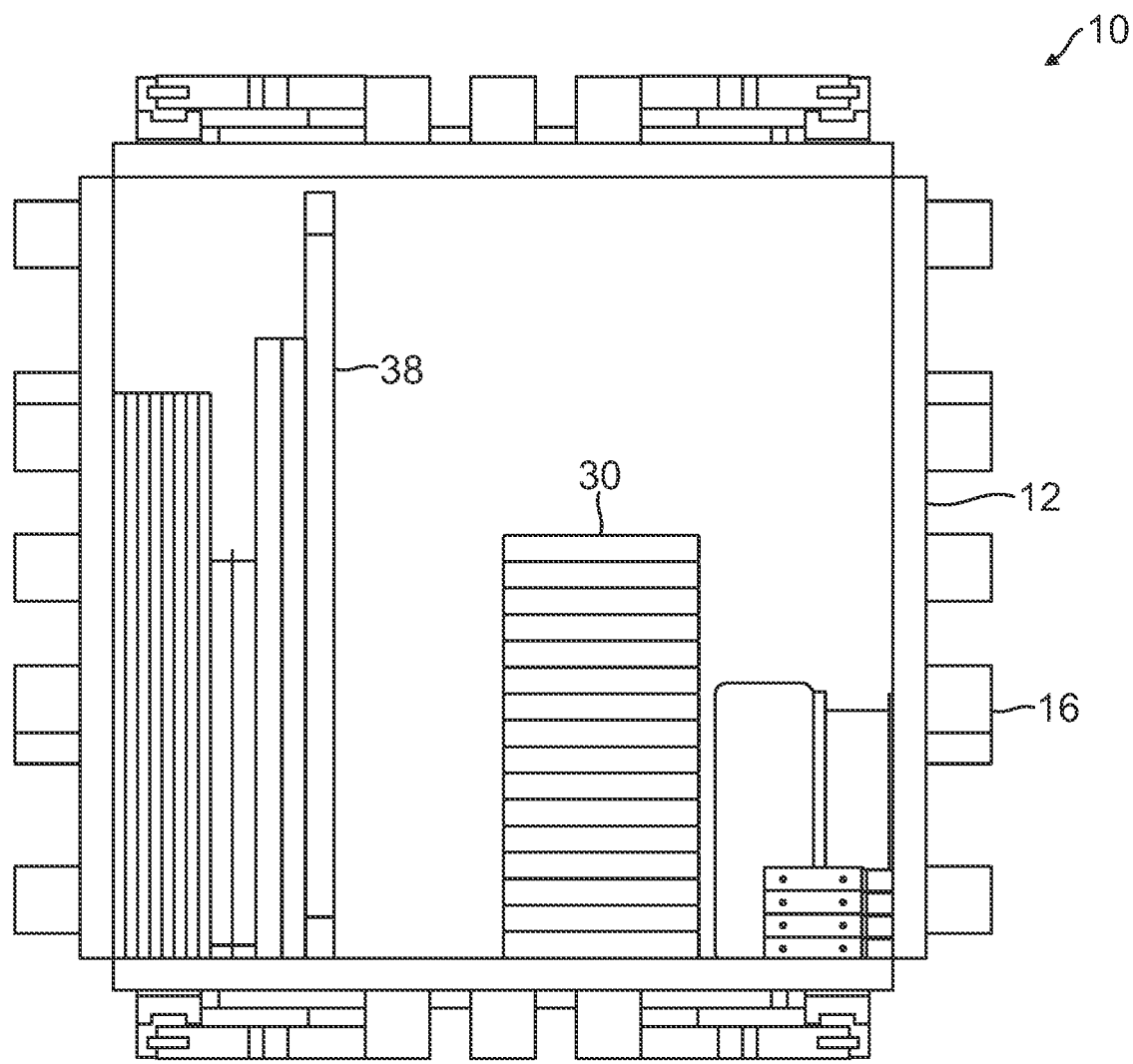
FIG. 2 is a cross-sectional view of the shelter in the storage cube configuration showing the storage of various components therein—to be a supplemental cube to the view shown in FIG. 5.
Figure 3:
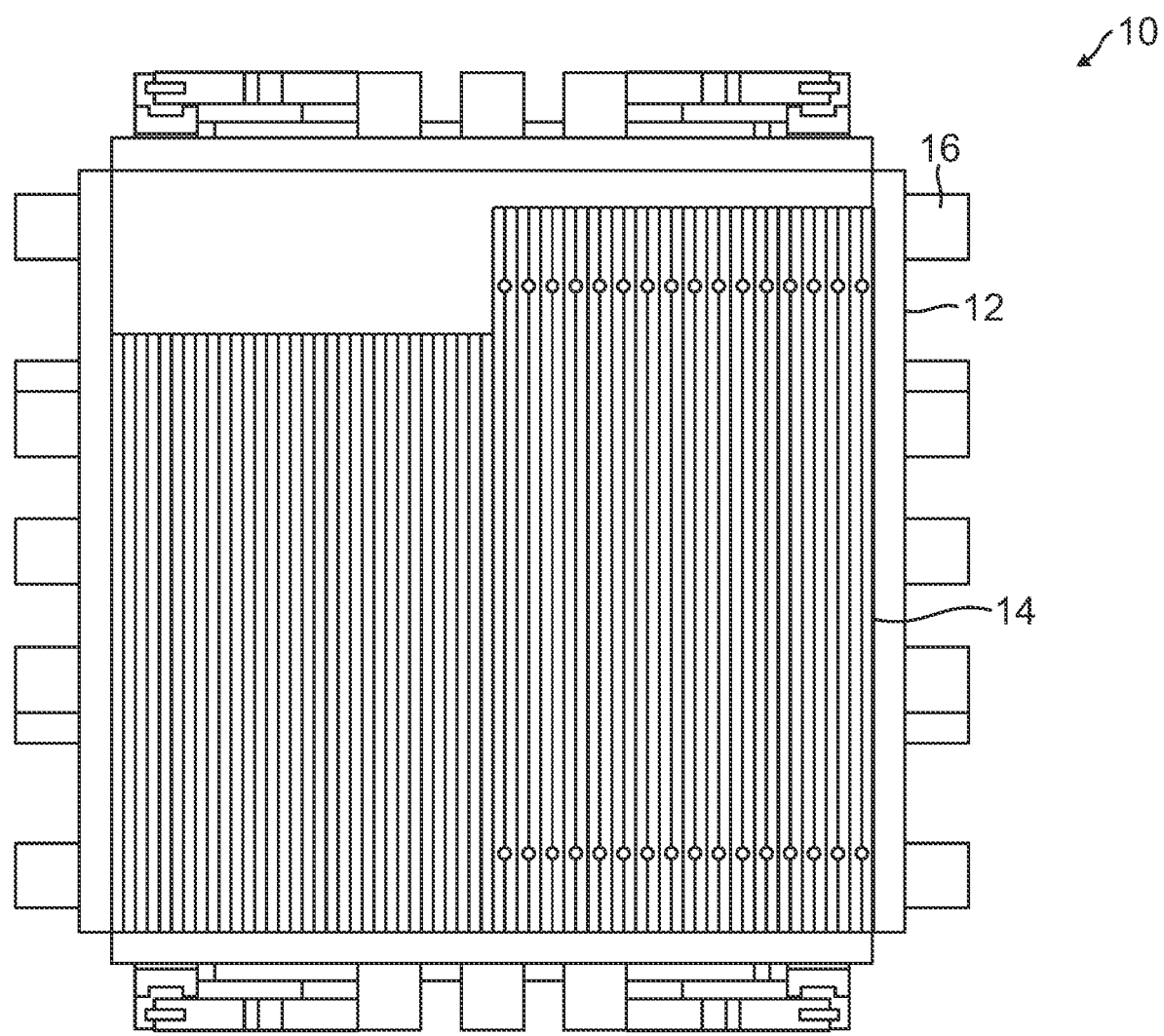
FIG. 3 is a cross-sectional view of the shelter in the storage cube configuration showing the hard, ruggedized walls for deployment of the completed shelter.
Figure 10:
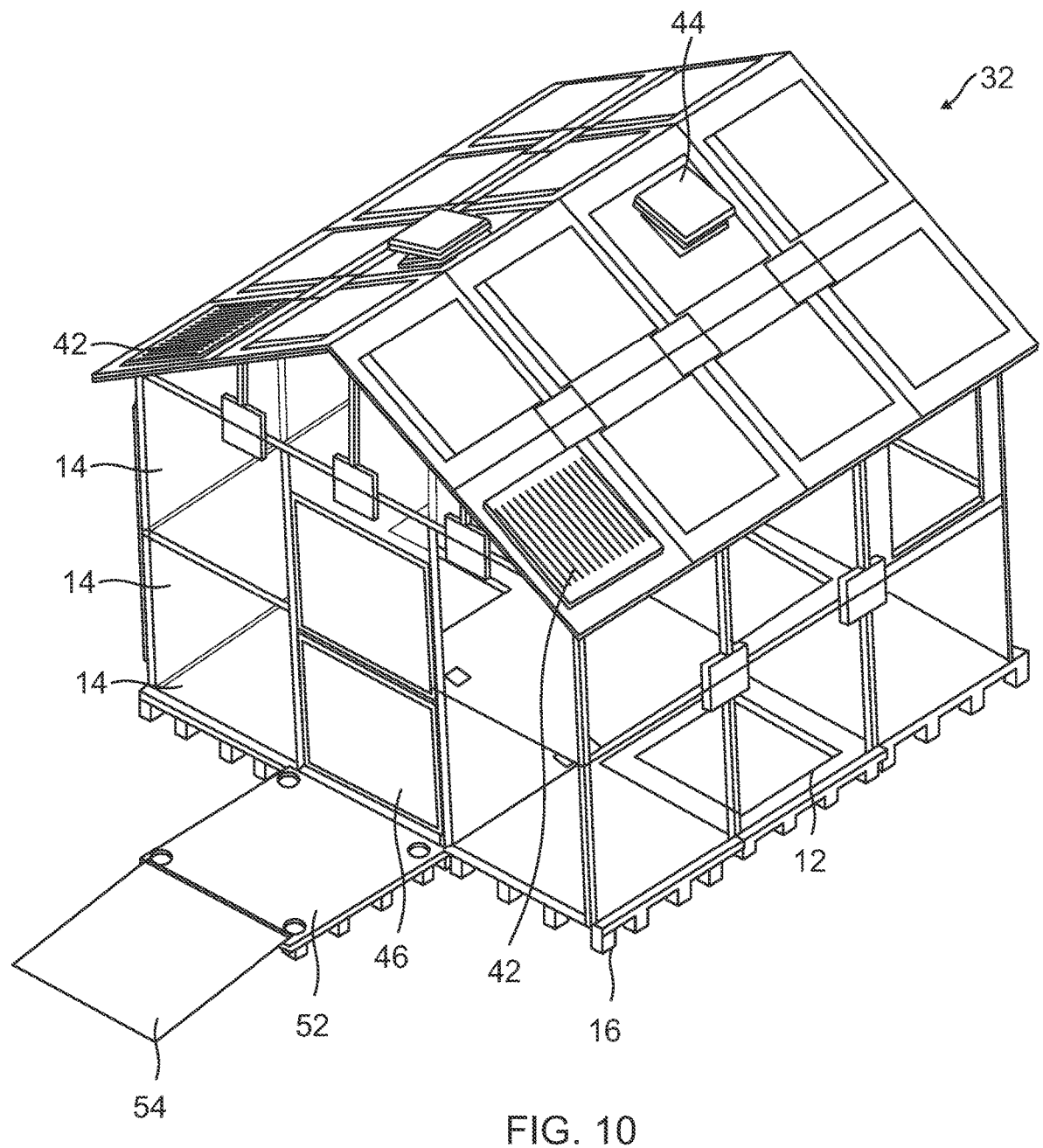
FIG. 10 is a front isometric view of the fully deployed shelter of the instant invention.
Figure 11:
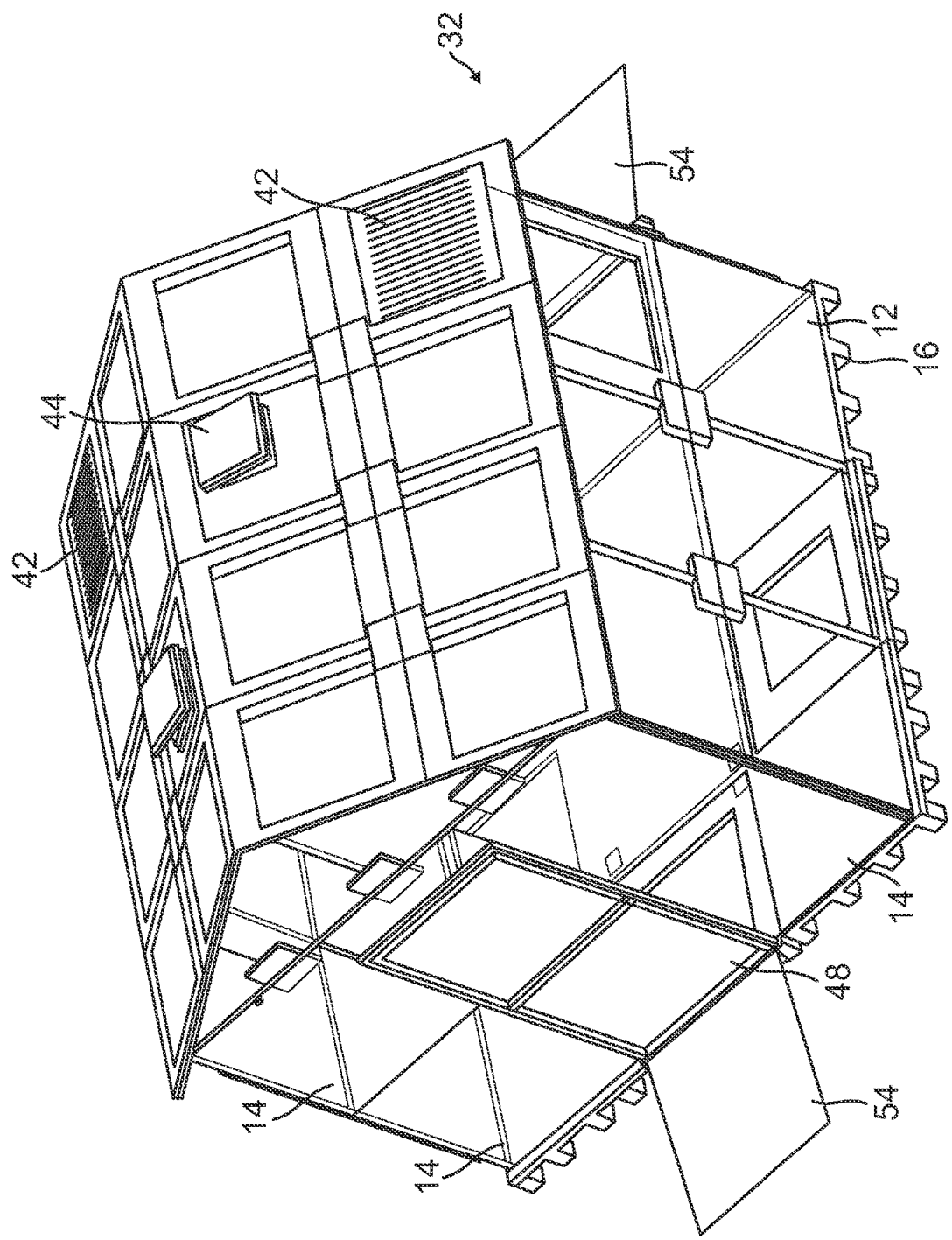
FIG. 11 is a rear isometric view of the fully deployed shelter of the instant invention.
Figure 12:
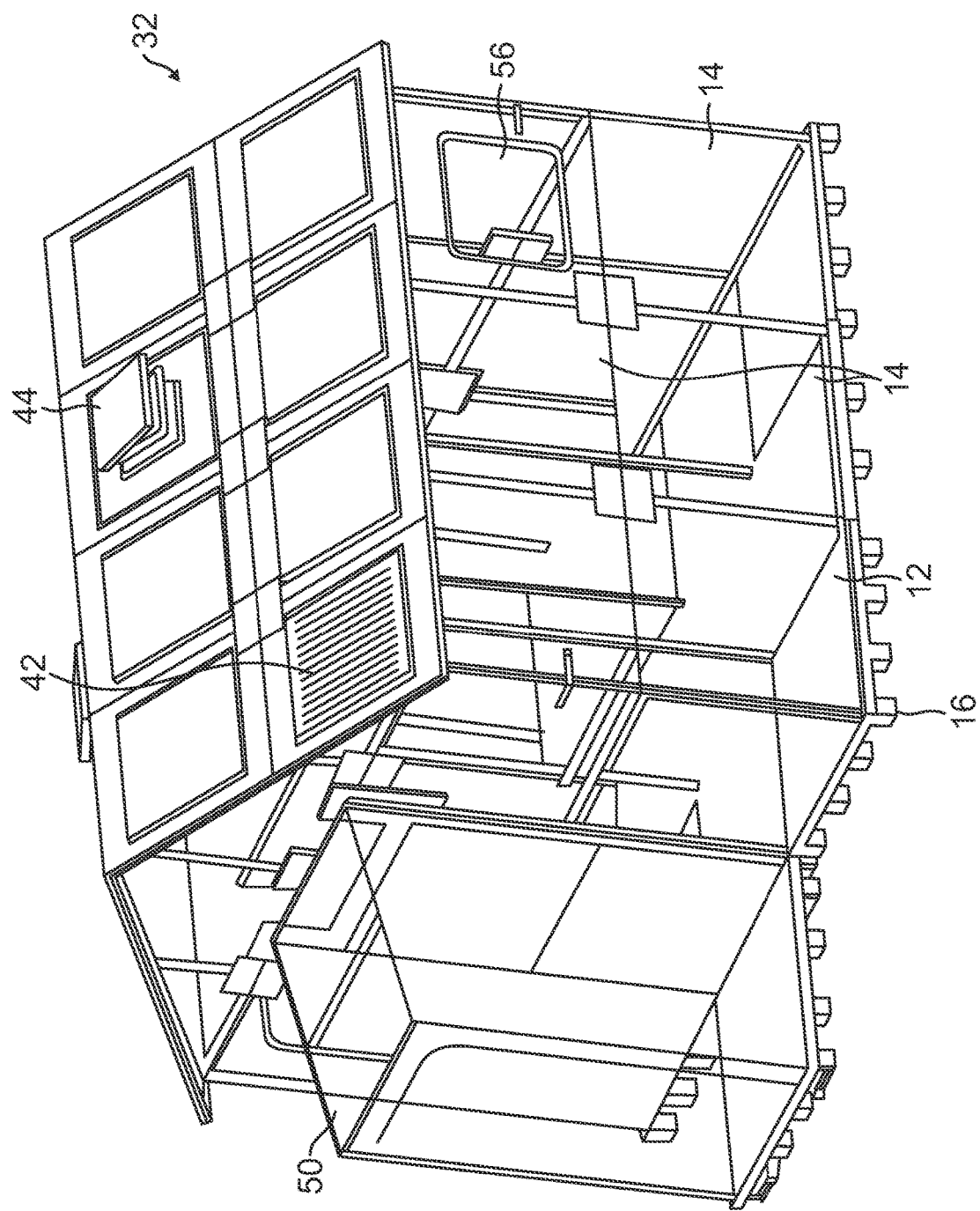
FIG. 12 is the view as shown in FIG. 12 with the "air lock" area at the front door to minimize change in temperature within the structure when moving parts and persons in and out and which can also act as a shower area if the shelter were used for recreational purposes.
Figure 13:
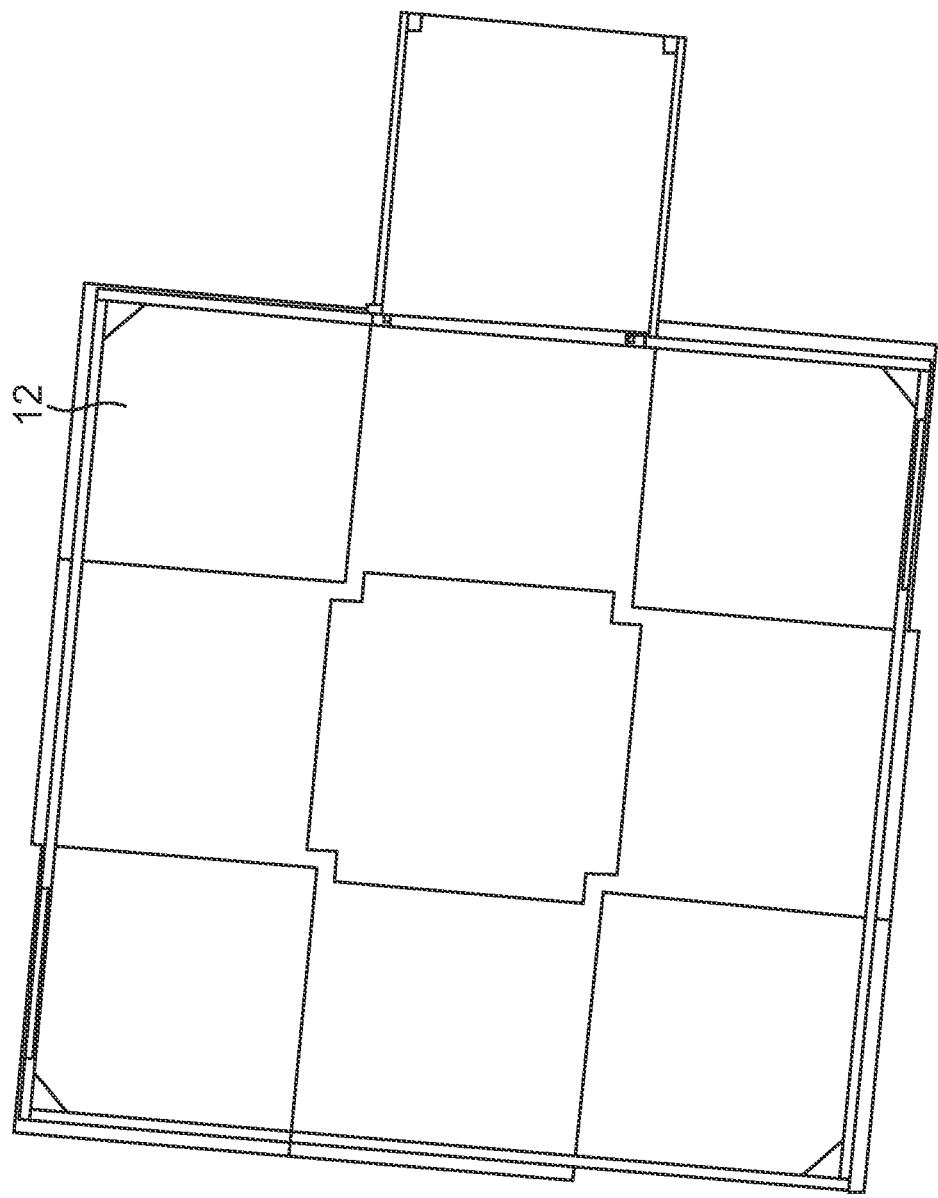
FIG. 13 is a top view of the deployed floor.

FIGS. 2 and 3 show the interior of two separate cube enclosures 10. This illustration is exemplary as more than two cubes O could be utilized as a part of any individual shelter configuration. In our example, one (FIG. 5) houses the wall panels 14 and the other (FIG. 4) is a supplemental cube which can house other components 30 that can be added to the shelter structure 32 once fully deployed (See FIGS. 10-12.) FIG. 13 shows a top view of the deployed minimum floor panels 12 whereas FIGS. 10-12 show the fully deployed shelter 32, which includes additional floor panels 12 to enlarge the interior space of the shelter 32. The additional floor panels 12 can be housed in the main shelter cube 10 (FIG. 3) or the supplemental cube (FIG. 2). An example of the types of accessories that can be housed in the supplemental cube (FIG. 2) include, but are not limited to, electrical panels, solar panels, canopy components, supporting members, weather stations, piping, tubing, etc.

Figure 14:
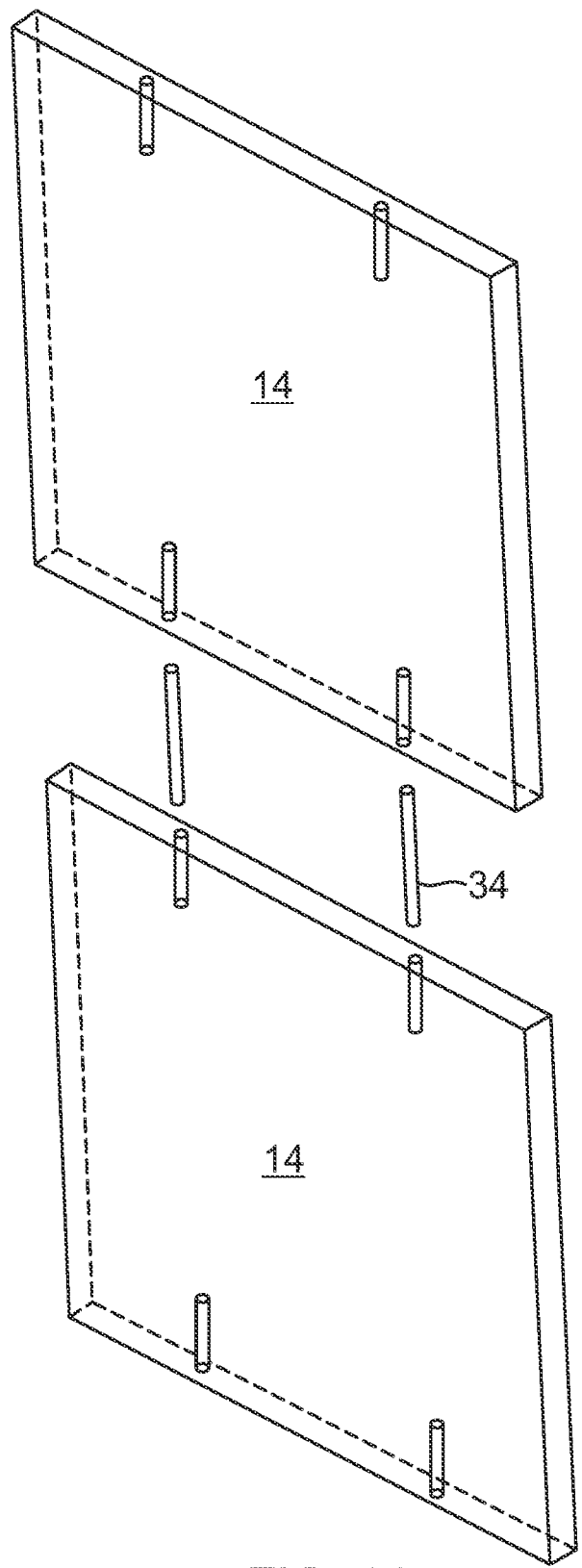
FIG. 14 is an exemplary isometric view of how two panels can be attached to each other through dowels to create a wall that is greater than the height of a single panel.
Figure 15:
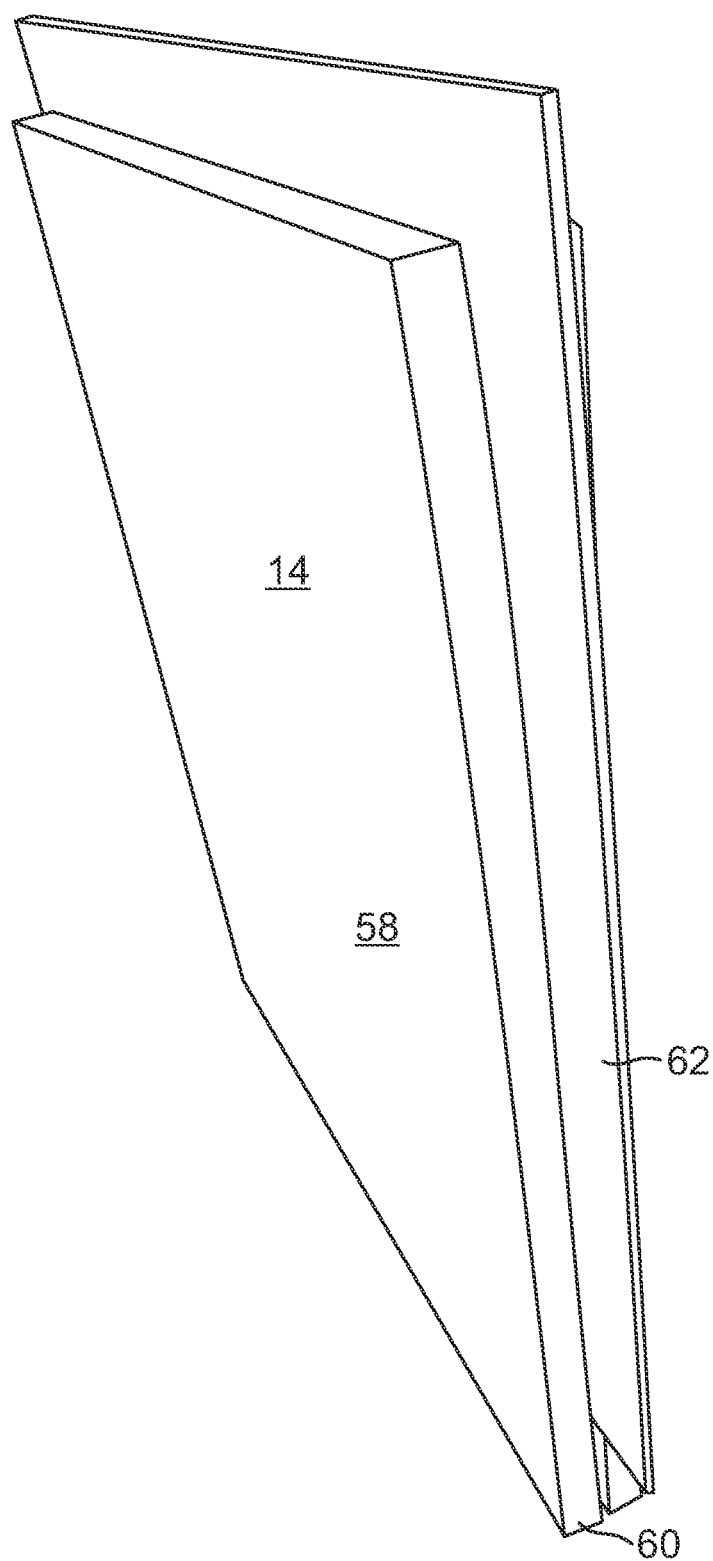
FIG. 15 is a side isometric view of a single panel with the exemplary slip fit connectors that can be an alternate connection method for panels through the top bottom and on the sides.
Figure 16:
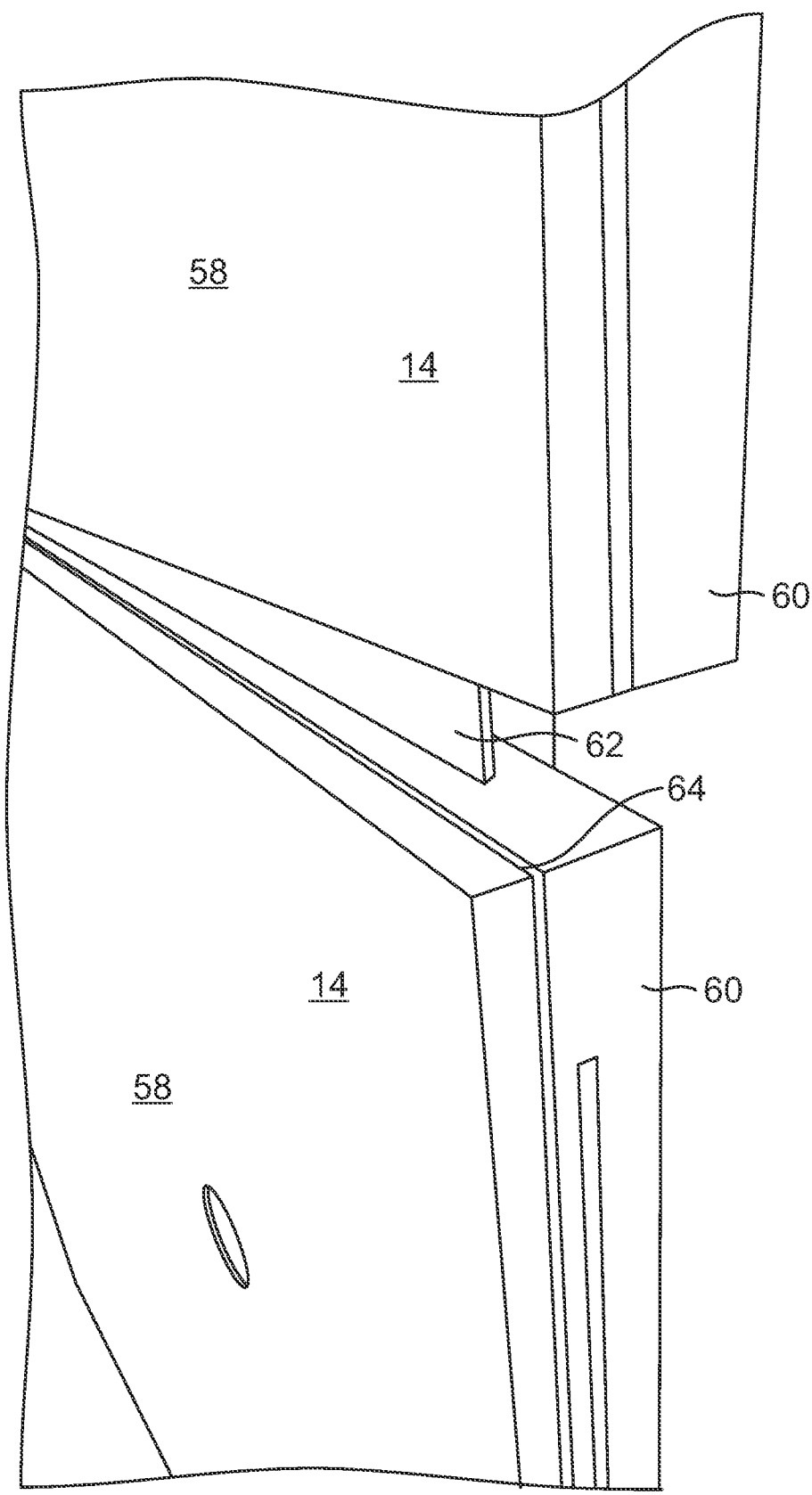
FIG. 16 is a close-up view of the slip fit connection for the walls panels of the instant invention.

Looking at FIGS. 10-12 as deployed, the shelter 32 includes the floor panels 12, interlocking rigid and ruggedized wall panels 14. The wall panels 14, as noted, are made of foam and can be treated with a liquid based coating that cures into a hard surface (e.g., polyurea) for strength, hardness, and durability. They can attach to each other on any of the sides of the substantially rectangular shape through a hinge mechanism, i.e., the pieces can be connected and foldable/unfoldable; through a dowel connection (See FIG. 14) or through specialized sides that can be seen in FIGS. 15-16 that fit into each other and which are called slip fit.

Each wall panel 14 can also include a recessed portion for the placement therein of solar panels, heat sinks or other desired components.

To deploy the shelter 32, straps surrounding the outside panels 12 are released and the floor panels 12 that form the enclosure 10 are deployed and attached to one another by means of hinges (such as may be found in a door hinge with a barrel and pin construction), dowels (See FIG. 14), or other conventional means. Any remaining unattached floor panels 12, the stiff, ruggedized wall panels, any structural members 38 and life-supporting accessories 30 are ready for deployment. The floor panels 12 that were in the enclosure 10 are also attached to the other floor panels 12. As noted above, supplemental cubes can accompany any self-contained shelter to include components that may not fit into just one cube, but which can add functionality to the shelter.

Figure 17:
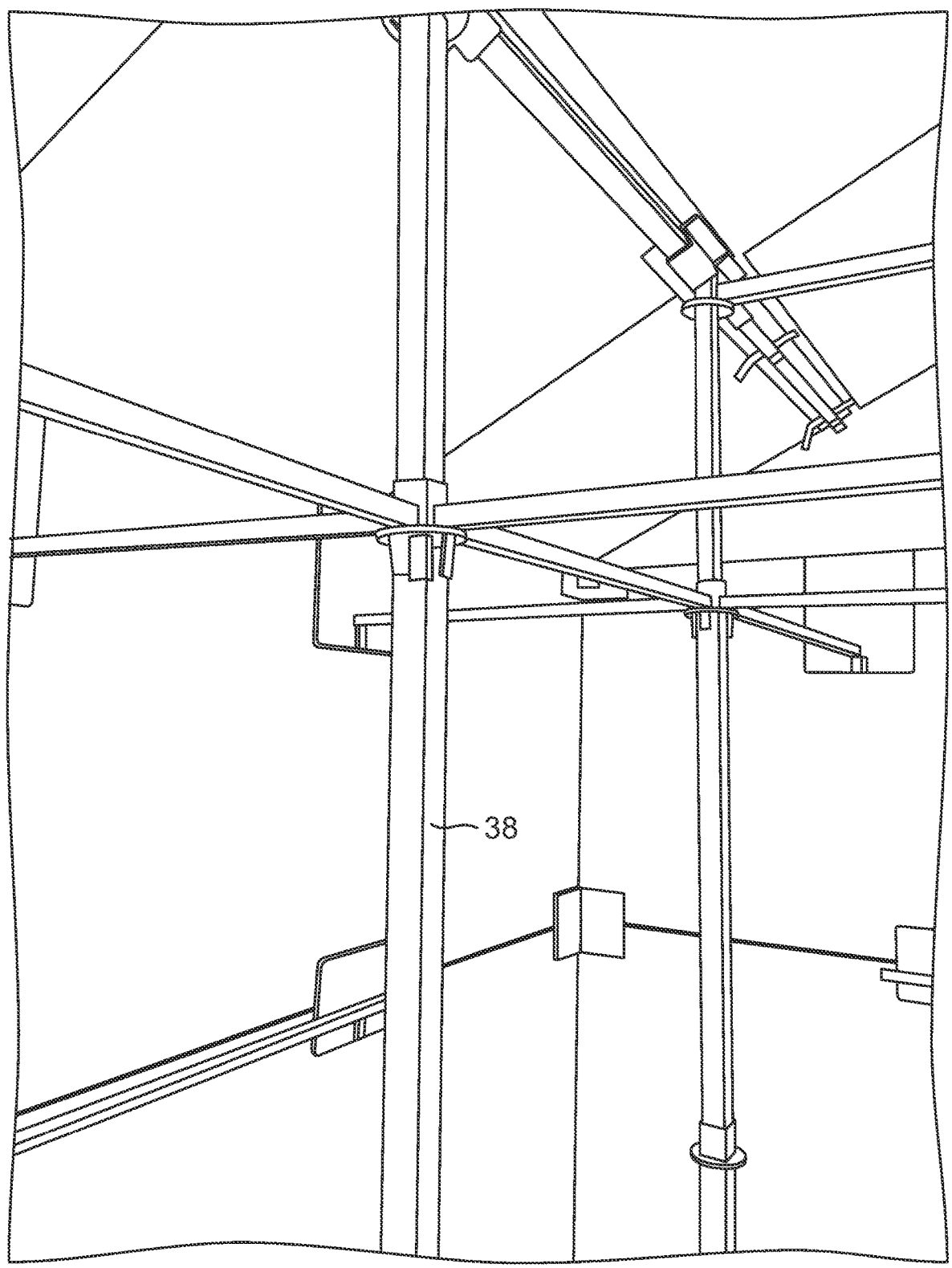
FIG. 17 is a view of the inside of the deployed structure showing the support structures close up that provide for various compartments inside of said shelter.

Preferably, the floor panels 12 are all of the same size and can be attached to one another along their edges by various means, as described above. The system is modular and any floor panel 12 or wall panel 14 can have embedded therein or attached thereto any of the accessories 30 desired. Additionally, some wall panels 14 can be configured to include windows 56 or can be used as roofing 40 or a canopy to house solar panels 42. The structural members 38 can be used to create a roof 40 as seen in FIGS. 10-12. A close-up of the interior of the deployed shelter 32 showing the structural members 38 is shown in FIG. 17 which also illustrates how separate compartments can be used for various purposes inside of the shelter 32 once deployed.

Vents 44 can be included on the roof 40 and on either side of the shelter 32 a front door 46 and a rear door 48 can be included with an optional air lock 50 (See FIG. 12) that allows for the maintenance of the internal temperature when persons or supplies are being moved in and out of the shelter 32. Ingress and egress panels 52 are a part of the floor in front of the front door 46. Ramps 54 can also be added to the entries of either the front door 46 or the rear door 48. Each wall panel 14 and floor panel 12 is flexible in design to include modifications for said windows 56, vents 44 or other accessories. Additionally, the recessed portions 36 of any panel can contain a variety of components.

Improvements over the '985 patent include stiff, ruggedized walls made of strong, durable foam that are treated with a liquid based coating that cures into a hard surface (e.g., polyurea) to strengthen the walls for more harsh conditions, the ability to modularly configure the shelter 32 by size and components, the inclusion of the slip fit fittings on the sides of each wall panel 14 (See FIGS. 15-16) and the recessed compartments 36 in the panels 14 that can also secure components therein.

In its essence, the instant invention provides for a transportable panel system 10 that can be assembled to form a structure 32, such as a floor, walls, a roof and a ceiling. The entire panel system is comprised of multiple adjoining panels 14 per surface, or side of the structure. These multiple panels 14 are stacked to make a vertical surface that is taller than the height of a single panel 12. The panel system can be designed so that adjoining panels interlock in a number of ways. They can interlock with one another due to their edge interface, e.g., male to female slip fit (See FIGS. 15-16).

Additionally, the panels 14 can connect to one another through pre-attached hinges or secondary assembled hinges which allows the panel system to unfold and fold into a structure where such panels include mounting means or leave outs for integration of other equipment, such as heat sinks, solar panels, weather stations, windows, doors, hatches, locks, tie down points, channels for cable, conduit, piping, brackets for secondary structure, environmental sensors, drainage, shower, sink, appliances, specialty equipment, storage compartments, lighting, air conditioner, heater, freezer, ducting, flag mount, etc. The panels 14 are designed and constructed to have unique structural properties to withstand extreme environmental conditions, such as rain, hail, snow, wind, earthquake, or withstand unusual impact forces, such as hammer strike, fired ammunition, explosion, etc. or have unique insulating properties for cold storage purposes, ability to protect from a high or low temperature ambient exterior temperatures or have unique material properties to withstand fire.

The completed structure is floatable so it can be used in areas of large bodies of water or flooding. The completed structure can be used for a variety of uses, such as living quarters, work area, cold storage, equipment room, etc.

The panel system does not require tools to assemble, and it is self-supporting when assembled and relies on an internal secondary structure 38 for structural support. Upon completion of assembly, joints can be sealed (e.g., caulked, flashing or flexible flaps added, taped) to minimize chances of air or temperature flow between panels. Such panel system, when deployed/assembled, has horizontal flat surfaces that can be used for sleeping area, equipment storage, or table surfaces.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible, and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such, equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A self-contained shelter with hauler comprising:
   at least one enclosure having a cubic shape which is a top, a bottom, and four side walls;
   a plurality of generally rectangular or square unattached floor panels contained inside, each of said floor panels having a top surface, a bottom surface and four sides;
   a plurality of stiff, ruggedized wall panels contained inside, each of said wall panels having a top surface, a bottom surface and four sides; and
   a plurality of life-supporting accessories contained inside said at least one enclosure, whereby, said enclosure and said plurality of generally rectangular unattached floor panels connect to form a raised floor and wherein said plurality of stiff, ruggedized wall panels connect to form an enlarged shelter composed of four or more walls and a roof constructed by connecting said plurality of wall panels;
   a hauler to transport said enclosure wherein said hauler has a slim profile comprising a main frame with at least two retractable members attached thereto that can extend away from said main frame in a substantially perpendicular orientation thereto wherein said retractable members and said main frame convert to a fork-lift configuration and wherein said main frame is attachable by two or more hitches to a motor vehicle thus enabling said hauler to accommodate the weight of said enclosure.

2. The self-contained shelter with hauler as defined in claim 1 wherein a platform is attachable to said retractable members.

3. The self-contained shelter with hauler as defined in claim 1 wherein each of said stiff, ruggedized wall panels is made of foam and treated with a liquid applied coating that cures into a hard surface.

4. The self-contained shelter with hauler as defined in claim 1 wherein any of said stiff, ruggedized wall panels can include a recessed portion for the placement therein of embedded accessories and utilities.

5. The self-contained shelter with hauler as defined in claim 4 wherein said accessories come from the group comprising: solar panels, heat sinks, cabling, piping, weather stations, electrical panels, batteries, water storage.

6. The self-contained shelter with hauler as defined in claim 1 and 4 wherein any two of said stiff, ruggedized wall panels can connect to each other to enlarge any constructed wall in a horizontal direction or in a vertical direction.

7. The self-contained shelter with hauler as defined in claim 6 wherein any two stiff, ruggedized wall panels are connected with dowels.

8. The self-contained shelter with hauler as defined in claim 6 wherein any two stiff, ruggedized wall panels are connected via foldable hinges.

9. The self-contained shelter with hauler as defined in claim 6 wherein said stiff, ruggedized wall panels are assembled with slip fittings on each side such that a female portion connects with a male portion on a second stiff, ruggedized wall panel.

10. The self-contained shelter with hauler as defined in claim 6 wherein any two stiff, ruggedized wall panels are connected via a press fit configuration.

11. The self-contained shelter with hauler as defined in claim 1 wherein any of said stiff, ruggedized wall panels can be configured to include a window or door.

12. The self-contained shelter with hauler as defined in claim 1 wherein any of said floor panels can include recessed portions for the securing of desired accessories therein and leave-outs for utilities.

13. The self-contained shelter with hauler as defined in 12 wherein said accessories come from the group comprising: solar panels, heat sinks, cabling, piping, weather stations, electrical panels, batteries, water storage.

14. The self-contained shelter with hauler as defined in claim 1 wherein an internal structural frame provides additional support for shelter and accessories.

15. The self-contained shelter with hauler as defined in claim 14 wherein said accessories come from the group comprising: storage areas, drawers, tabletop, cupboards, sleeping quarters, lighting, equipment mounting, internal walls.

* * * * *